United States Patent Office 3,342,757
Patented Sept. 19, 1967

3,342,757
PROCESS FOR PREPARATION OF
POLYURETHANE FOAM
William J. Considine, New Brunswick, N.J., and Michael A. Ricciardi, Hazleton, Pa., assignors, by mesne assignments, to M & T Chemicals Inc., New York, N.Y., a corporation of Delaware
No Drawing. Filed Mar. 1, 1962, Ser. No. 176,777
15 Claims. (Cl. 260—2.5)

This invention relates to the preparation of polyurethanes and more specifically to novel catalysts which may be particularly useful in preparing polyurethane foams by the so-called one-shot process.

It is well known that a polyurethane can be prepared by reacting an organic polyfunctional isocyanate with a polyalkylene polyol, i.e. an organic compound having two or more reactive hydrogen atoms (as determined by the well-known Zerewitinoff determination) such as are found on e.g. a polyester, a polyester amide, a polyalkylene ether, a polyacetal, or a polyalkylene thioether. When this reaction is conducted under anhydrous conditions, the resulting polyurethane may be non-porous. If a cellular or foamed product be desired, water and an excess isocyanate can be added to the mixture. When water reacts with the excess isocyanate groups not previously reacted, carbon dioxide may be formed which is entrapped in the reaction mixture. An auxiliary blowing agent, such as a volatile fluorocarbon, may also be employed. The gelling time of the reaction mixture is commonly controlled preferably to be slightly longer than the rise time, so that the solidifying mass entraps therewithin the carbon dioxide or other gas thereby giving a foamed product.

As is well known to those skilled in the art, various materials have been employed as catalysts or activators in the formation of polyurethanes. Most common of these are amines, typically tertiary amines such as N-ethyl morpholine. These catalysts may have as their prime function the control of the gas-forming reaction although they also may serve to catalyze the gelation reaction. Amines, while commonly used, are generally considered undesirable because they possess one or more of the following characteristics: high volatility which results in a high rate of loss from the reaction mixture, obnoxious odor, high solvent activity which may affect paint or other coating materials, toxicity, etc. The polyurethane products prepared from amine-catalyzed reactions also possess these undesirable features. The obnoxious odor severely limits the end uses to which these materials can be put. From the production standpoint, the stability of the conventional activators in the formulations is short, typically less than e.g. 4–5 hours, and careful supervision must be exercised in continuous production operations to insure that the activators are active when used.

A wide variety of other catalysts have been tried. Particularly in the one-shot reaction, the preparation of foamed polyurethanes requires a predetermined control of both the blowing or gas-forming reaction which liberates carbon dioxide, and the gelation or setting reaction which forms the fluid mixture into a more-or-less firm foam. It has been found that desired foam time or rise time should be about 70–120 seconds, typically 90 seconds, measured under commercial conditions in an environmental temperature of about 25° C. Similarly, it has also been found that the gel time should be at least as long as the rise time. Successful commercial operation requires that the gel time be about 70–130 seconds, preferably 110 seconds. Obviously the gel time must be sufficiently long to permit the fullest development of the foaming reaction.

Although many catalyst systems have been tried, there is no simple commercial system which will permit the production of catalytically formed polyurethane foams which are free of the amine-derived objections noted supra. Despite these objections, primarily the odor which severely limits the areas of application of the foams, amines are commonly employed because no satisfactory substitute has been found, particularly in one-shot systems.

It is an object of this invention to provide improved and odorless foamed products based on polyurethanes. Other objects will be apparent to those skilled in the art on inspection of the following description.

In accordance with certain aspects of this invention, the process of making a cellular polyurethane by the reaction of a substance having active hydrogen atoms as determined by the Zerewitinoff method, an organic polyisocyanate, water, and a gel catalyst may be carried out by using as a blowing catalyst a soap of a metal selected from the group consisting of ammonium, alkali metals and alkaline earth metals.

A variety of organic polyfunctional isocyanates i.e. organic polyisocyanates may be used in the process of the present invention although diisocyanates are preferred in many formulations. Suitable polyfunctional isocyanates include alkylene diisocyanates such as hexemethylene diisocyanate and decamethylene diisocyanate, arylene diisocyanates such as phenylene diisocyanates, tolylene diisocyanates, naphthalene diisocyanates, 4,4'-diphenylmethane diisocyanates, or isomers or mixtures of any of these. Triisocyanates typically obtained by the reaction of three moles of an arylene diisocyanate with one mole of a triol—for example, the reaction product formed from three moles of tolylene diisocyanate and one mole of hexanetriol or of trimethylol propane, may be employed. A preferred polyisocyanate is the mixture of 80% 2,4-tolylene diisocyanates and 20% 2,6-tolylene diisocyanate.

The substances having two or more active hydrogen atoms as determined by the Zerewitinoff method, e.g. the polyalkylene polyols which may be employed in practice of this invention, will be organic compounds having two or more reactive hydrogen atoms which will react with organic polyfunctional isocyanates to give urethane polymers. These polyalkylene polyols, typically having a molecular weight of at least about 500, may include polyesters, polyethers, polyisocyanate modified polyesters, polyisocyanate modified polyester amides, alkylene glycols, polymercaptans, polyamines, polyisocyanate modified alkylene glycols, etc. It will be understood that these polyalkylene polyols may have active primary or secondary hydroxyl groups. The polyalkylene polyol may be a hydroxyl-containing polyether or polyester including fatty acid glycerides. Polyesters, which are a preferred type of polyalkylene polyol, may be obtained by esterification condensation reaction of e.g. an aliphatic dibasic carboxylic acid with a glycol or a triol or mixture thereof in proportions such that the resultant polyesters may contain predominantly terminal hydroxyl groups. Dibasic carboxylic acids suitable for preparing polyesters may include aliphatic and aromatic acids such as adipic acid, fumaric acid, sebacic acid, phthalic acid; suitable alcohols include ethylene glycols, diethylene glycols, trimethylol propane, etc. The fatty acid glycerides may include those having a hydroxyl number of at least about 50 such as castor oils, hydrogenated castor oil, or blown natural oils.

Polyethers, another preferred type of polyalkylene polyol, may include polyalkylene glycols, e.g. polyethylene glycols and polypropylene glycols preferably having a molecular weight of at least 200. For convenience, the term "polyol" or "polyalkylene polyol" may be employed to designate the substances having two or more active hydrogen atoms as determined by the Zerewitinoff method, which may be employed in practice of this invention.

Formation of the preferred foamed products of this invention may be accomplished in a one-shot system by reacting the polyol with excess polyfunctional isocyanate in the presence of water and cell modifying agents, e.g. silicones such as trimethyl end-blocked dimethyl polysiloxanes. The polyfunctional isocyanate is typically present in amount of 5%–300%, say 40% by weight of the polyol. The water should be present in amount to react with the isocyanate to liberate sufficient gas to produce a foam of the desired physical characteristics. From 0.5% to 10%, say 5% water (by weight of polyol) will give good results. The mixing of the constituents may be carried out at elevated temperature or at room temperature.

In a typical two-step operation, the polyol may be reacted with excess polyfunctional isocyanate in the absence of water. Subsequently water and other agents may be added to the mixture.

The blowing or gas-forming catalysts of this invention may be soaps of metals selected from the group consisting of the alkali metals and the alkaline earth metals. Typical alkali metals may include lithium, sodium, potassium, and ammonium (including substituted ammoniums). Typical alkaline earth metals may include calcium, magnesium, barium, and strontium. Typical of the preferred metals which may be employed may be: $NR''_4{}^+$, $Ba^{+2}$ and $Na^+$.

These metals may be employed singly or in combination. Metals equivalent to those noted may also be employed. The preferred form of $NR''_4{}^+$ may be $NH_4{}^+$, although $R''$ may be a hydrocarbon group, including aliphatic or cycloaliphatic groups, aryl groups, alkaryl groups, aralkyl groups, etc. Preferably $R''$ may be a lower alkyl group having less than about 12 carbon atoms. The anionic component of the soap may be expressed in simplest form as $R'''(COO—)_n$ wherein $R'''$ represents a hydrocarbon group, typically an aliphatic or cycloaliphatic group such as alkyl, alkenyl, etc. and corresponding cyclic groups such as cycloalkyl, etc. groups; an aryl group such as phenyl, substituted phenyls, naphthyl, etc.; an aralkyl group such as benzyl, styryl, cinnamyl, etc.; an alkaryl group such as tolyl, xylyl, etc.; a cycloaliphatic group such as a naphthenic group; etc. Other equivalent groups may be employed. Preferably $n$ is 1 and the acid is monobasic. $n$ may be a small whole integer, typically 1, 2, 3, etc. In the preferred embodiment, $R'''$ may be an alkyl group having less than about 20 carbon atoms. Typical of the acids from which the soaps may be prepared may be acetic acid, propionic acid, butyric acid, caproic acid, caprylic acid, capric acid, stearic acid, oleic acid, etc. Naphthenic acid may be employed. The commercially-occurring mixture of acids known as tall oil fatty acids may be employed.

It is preferred that the soap be formed from an amount of acid sufficient to satisfy each of the valence bonds of the metal. The soaps which may be used in practice of this invention may be those materials prepared for example by neutralizing a basic compound of the metal, typically the hydroxide or oxide e.g. barium hydroxide, with an acid, e.g. stearic acid, to yield barium stearate; or by the reaction of e.g. calcium chloride and sodium stearate to give calcium stearate. Mixtures of soaps may be employed including soaps having different anions or soaps prepared from commercial grades of fatty acids.

The soaps which may be used as the blowing catalysts of this invention may commonly be characterized by more-or-less fixed and well defined chemical structure, their generally solid state at room temperature or by their viscous-to-near viscous nature and by their generally strongly-to-moderately strongly basic nature.

It will be apparent to those skilled in the art that these soaps are commonly represented as having the formula $M(OOCR''')_v$ where $v$ is the valence of the metal. For simplicity, this formula may be employed although it will be apparent to those skilled in the art that at least the soaps of some polyvalent metals may possess a structure which may not be accurately thus represented.

Typical of the soaps which may be employed in practice of this invention may be: calcium naphthenate, ammonium stearate, dimethylammonium stearate, trimethylammonium stearate, calcium stearate, magnesium stearate, barium stearate, lithium stearate, sodium stearate, strontium stearate, potassium oleate, ammonium tallate, and strontium 2-ethylhexoate.

The preferred compound which may be employed may be calcium naphthenate. Other preferred compounds may include barium stearate, and sodium stearate.

It is a feature of this invention that the blowing catalysts herein noted may be used in connection with a wide variety of gel catalysts including for example stannous 2-ethyl hexoate, etc. In practice of the preferred embodiment of this invention, the preferred gelation catalyst which may be employed may be selected from the group consisting of $Sn(OCOR)_2$ and $R'_aSnX_b$. Other equivalent gelation catalysts may be employed. In the stannous compounds, $Sn(OCOR)_2$, R may be a hydrocarbon residue typically alkyl, alkenyl, aryl, aralkyl, alkaryl, cycloalkyl, etc. R may for example be methyl, ethyl, propyl, isopropyl, n-butyl, isobutyl, t-butyl, amyl, hexyl, heptyl, octyl, nonyl, decyl undecyl oleyl i.e. 7-heptadecenyl etc., phenyl, o-, m-, or p-tolyl, naphthyl, cyclohexyl, benzyl, etc. The nature of R will of course define the group —OCOR; when R is methyl for example, this group may be the acetate group. Preferably however the R group will contain at least about 7 carbon atoms and less than about 17 carbon atoms. When R is heptyl, the group —OCOR may be the 2-ethylhexoate group; when R 7-heptadecenyl, the group —OCOR is the oleate group, etc. The preferred compounds which may be employed may be stannous 2-ethylhexoate and stannous oleate.

In the organotin compounds $R'_aSnX_b$, $R'$ may be the same as R. Preferably $R'$ will be a hydrocarbon residue, typically alkyl, alkenyl, aryl, alkaryl, aralkyl, cycloalkyl, etc. $R'$ may be for example methyl, ethyl, propyl, isopropyl, n-butyl, isobutyl, t-butyl, amyl, hexyl, heptyl, octyl, nonyl, decyl, undecyl, oleyl i.e. 7-heptadecenyl, etc. phenyl, o-, m-, or p-tolyl, naphthyl, cyclohexyl, benzyl, etc. The sum of $a$ and $b$ will be 4, and either of $a$ and $b$ may be 1, 2, and 3. The preferred $R'$ group is the n-butyl group, $C_4H_9$—.

In the organotin compounds $R'_aSnX_b$, X may be selected from the group consisting of chlorides and the negative residual portions of organic carboxylic acids RCOO—, mercaptides RS—, alcohols RO—, esters of mercaptoacids $ROOC(CH_2)_nS$— wherein R may be hydrogen or the other residues herein before noted; etc. Typical specific residual portions may include the 2-ethylhexoate, the lauryl mercaptide, the methoxide, and the isooctyl thioglycolate.

The preferred organotin compounds $R'_aSnX_b$ may be those wherein $a$ and $b$ are 2: e.g. dibutyltin dilaurate and dibutyltin di-2-ethylhexoate.

In practice of the invention, the gel catalyst and the blowing catalyst may be present in ratio of 0.01 to 5 pars, say 1 part of the former per part of the latter. In one preferred embodiment, when calcium naphthenate and stannous 2-ethylhexoate are used the ratio will be approximately 1.

Preferably the catalyst mixture will be present in catalytic amount corresponding to 0.01 to 5, say 0.6 part by weight per 100 parts of polyol. Preferably, the blowing catalyst will be present in a catalytic amount corresponding to 0.005 to 4.95, say 0.3 part by weight per 100 parts of polyol, and the gel catalyst will be present in a catalytic amount corresponding to 0.005 to 4.2 parts, say 0.3 part by weight per 100 parts of polyol.

Practice of this invention according to its specific embodiments may be observed by forming a typical one-shot polyether flexible foam by mixing (a) 100 parts of polyalkylene polyol (the polyether triol formed as the condensation product between glycerine and propylene oxide, having a molecular weight of about 3000, a hydroxyl number of about 56); (b) 1.0 part of cell modifying agent, silicone (Union Carbide Chemical Co. L–520 brand of trimethyl end blocked dimethyl polysiloxane); (c) 38.6 parts of tolylene diisocyanate (80%/20% ratio of 2,4- and 2,6-isomers); (d) 2.9 parts of demineralized water; (e) 0.3 part (except as otherwise indicated) of the metal soap as a foaming or blowing catalyst; and (f) 0.3 part (except as otherwise indicated) of the gel catalyst. Table I infra discloses specific examples using the combinations of catalysts noted, wherein stannous 2-ethylhexoate is used as gel catalyst. Thus, in Example 1 of the table, the reaction mixture includes triol, silicone, diisocyanate, and water, together with stannous 2-ethylhexoate gelation catalyst, and calcium stearate blowing catalyst.

In each of the examples, all of the components of the formulation were vigorously stirred upon mixing. The reaction started substantially immediately as evidenced by foaming. The cellular polyurethane product foamed and gelled promptly. The rise time was noted as the time at which the foam had risen to its maximum height. The exotherm was measured by placing a thermometer in the foam and noting the highest temperature to which it rose. Immediately after the mass had foamed, the surface was scraped with a spatula; this was done at 5-second intervals. The gel time was that time when, after scraping, the material did not flow or knit back together. The gel and rise times obtained by these tests are readily correlatable with those obtained in commercial practice. The results are tabulated in Table I.

TABLE I

| Example No. | Metal Soap | Rise Time (Seconds) | Gel Time (Seconds) | Exotherm, °C. |
|---|---|---|---|---|
| 1 | Calcium stearate | 105 | 120 | 104 |
| 2 | Magnesium stearate | 115 | 130 | 108 |
| 3 | Barium stearate | 85 | 100 | 99 |
| 4 | Lithium stearate | 60 | 80 | 107 |
| 5 | Sodium stearate | 70 | 85 | 108 |
| 6 | Ammonium tallate | 85 | 95 | 131 |
| 7 | Potassium oleate | 130 | 150 | 115 |
| 8 | Strontium 2-ethylhexoate | 120 | 135 | 121 |
| 9 | Calcium naphthenate | 75 | 85 | 123 |
| 10 | Ammonium stearate | 85 | 95 | 131 |

Stannous 2-ethylhexoate and stannous oleate are typical of the gelling catalysts which may commonly be made by neutralizing an aqueous solution of a stannous salt with a soap of the desired acid, RCOOH; typically an aqueous solution of stannous chloride may be reacted with a solution of sodium oleate to give the compound stannous oleate, a typical example of materials commonly believed to have the formula $Sn(OCOR)_2$.

Similarly, selected reactions were run using other polyols e.g. specifically a clear glycol adipate type polyester having a hydroxyl number of 52, an acid number of 1.7, a specific gravity at 25° C. of 1.19, a Gardner color of 2.0, a Brookfield viscosity at 25° C. of 1900 cps., a water content (Karl Fischer) of 0.07 and sold under the trademark Foamrez-50 by Witco Chemical Co. The product foams were comparable to those noted in the above table.

A control reaction using the formulation including polyether triol etc. but using as the gel catalyst 0.3 part of stannous 2-ethylhexoate and as the blowing catalyst 0.3 part of N-ethylmorpholine was found to have a rise time of 110 seconds, a gel time of 120 seconds, and an exotherm of 110° C. The product foam had an undesirable amine odor whereas the product foams of the examples were completely free of any such obnoxious odor. In another control experiment, the gel catalyst of the previous example, stannous 2-ethylhexoate was replaced by 0.3 part of calcium stearate. After 420 seconds the foam had still not come to a full rise, and there was no gel strength apparent. Thus, it may be seen that the blowing catalyst soaps of this invention do not also function as gel catalysts, i.e. they do not possess the ability to accelerate the gelation reaction. Thus, by the use of the novel catalysts of this invention it may be readily possible to vary the gel and foaming times independently, so that the optimum value for each may be readily attained. Comparison of these controls with the examples, indicates that, by synergistic effect, it is possible to obtain substantially decreased rise and gel times by use of the novel catalyst mixture.

From Table I, it will be apparent that the product foams are satisfactory. Where the rise time or the gel time is lower than the hereinbefore noted preferred limits, these may be increased by decreasing the amount of blowing catalyst or gel catalyst; and vice versa. These product foams are completely free of the undesirable amine-derived odor which has heretofore characterized similar foams prepared by using amines such as N-ethylmorpholine as blowing catalyst; thus these foams may be used where prior art foams could not be used because of their obnoxious odor.

It is a particular feature of the novel blowing catalysts of this invention that they may be compatible with blowing catalysts heretofore employed—typified by amine-type catalysts such as N-ethylmorpholine or tetramethyl 1,4-butane diamine. Accordingly, if it be desired, the novel blowing catalysts, e.g. calcium naphthenate, can be used with N-ethylmorpholine. To illustrate the possible simultaneous use of more than one of the novel blowing catalysts, an experiment was run using the same typical one-shot polyether flexible foam formulation noted supra, immediately preceding Table I. The blowing and gel catalysts employed were as follows:

TABLE II

| Ex. | Blowing Catalyst | Gel Catalyst |
|---|---|---|
| 11 | 0.15 pt. barium stearate, 0.15 pt. lithium stearate. | 0.3 pt. dibutyltin di-2-ethyl-hexoate. |

Table III shows the rise time, gel time, and exotherm temperature of the product foams.

TABLE III.—EXAMPLE NO. 11

Rise time (seconds) _____ 80
Gel time (seconds) _____ 90
Exotherm (° C.) _____ 123

From the above table, it will be apparent that satisfactory foams may be prepared by using the novel blowing catalysts of this invention in combination with each other and specifically for example the combination of two metal compounds having different cations and the same anions.

The novel catalytic compositions of this invention which are suitable for use as blowing and gel catalysts in the production of polyurethane foams by the reaction of a substance having active hydrogen atoms as determined by the Zerewitinoff method e.g. a polyalkylene polyol, water, and an organic polyfunctional isocyanate, may contain a gel catalyst and, as a blowing catalyst, a soap of a metal selected from the group consisting of alkali metals and alkaline earth metals e.g. lithium, sodium, potassium, ammonium, calcium, magnesium, barium, and strontium. These novel compositions are amine-free, odor-free, complete catalysts for polyurethane production. The novel polyurethane foams obtained by the process of this invention find a wider variety of uses than polyurethanes heretofore known.

The novel cellular polyurethane compositions prepared in accordance with this invention may comprise a cellular polyurethane containing a gelling agent and as a blowing agent 0.004–4.5 parts by weight per 100 parts of polyurethane composition of a soap of a metal selected from the group consisting of alkali metals and alkaline earth metals e.g. lithium, sodium, potassium, ammonium, calcium, magnesium, barium, and strontium. This novel cellular polyurethane composition may be readily formed into shaped cellular polyurethane objects which may find use in the fabrication of cushions, insulation, and in other areas where cellular polyurethane compositions have heretofore been employed.

Although this invention has been described with reference to specific examples, it will be apparent that various modifications may be made thereto which fall within the scope of this invention.

We claim:

1. The process of making a cellular polyurethane which comprises reacting a substance having active hydrogen atoms as determined by the Zerewitinoff method, an organic polyisocyanate, water, gel catalyst selected from the group consisting of $Sn(OCOR)_2$ and $R'_aSnX_b$ wherein R and R' are independently selected from the group consisting of alkyl, alkenyl, aryl, aralkyl, alkaryl and cycloalkyl, X is selected from the group consisting of chloride and negative residual portions of carboxylic acids, mercaptides, alcohols and esters of mercaptoacids, $a=1–3$ and $a+b=4$, and as a blowing catalyst a soap of a metal selected from the group consisting of ammonium, alkali metals and alkaline earth metals.

2. The process of making a cellular polyurethane as claimed in claim 1 wherein the blowing catalyst is a sodium soap.

3. The process of making a cellular polyurethane as claimed in claim 1 wherein the blowing catalyst is an ammonium soap.

4. The process of making a cellular polyurethane as claimed in claim 1 wherein the blowing catalyst is a calcium soap.

5. The process of making a cellular polyurethane as claimed in claim 1 wherein the blowing catalyst is a lithium soap.

6. The process of making a cellular polyurethane as claimed in claim 1 wherein the blowing catalyst is a magnesium soap.

7. The process of making a cellular polyurethane as claimed in claim 1 wherein the blowing catalyst is a barium soap.

8. The process of making a cellulary polyurethane as claimed in claim 1 wherein the blowing catalyst is ammonium tallate.

9. The process of making a cellular polyurethane as claimed in claim 1 wherein the blowing catalyst is calcium naphthenate.

10. The process of making a cellular polyurethane as claimed in claim 1 wherein the blowing catalyst is barium stearate.

11. The process of making a cellular polyurethane as claimed in claim 1 wherein the blowing catalyst is sodium stearate.

12. The process of making a cellular polyurethane which comprises reacting a substance having active hydrogen atoms as determined by the Zerewitinoff method, an organic polyisocyanate, water, gel catalyst selected from the group consisting of $Sn(OCOR)_2$ and $R'_aSnX_b$ wherein R and R' are independently selected from the group consisting of alkyl, alkenyl, aryl, aralkyl, alkaryl and cycloalkyl, X is selected from the group consisting of chloride and negative residual portions of carboxylic acids, mercaptides, alcohols and esters of mercaptoacids, $a=1–3$ and $a+b=4$, and as a blowing catalyst 0.005–4.95 parts of a soap of a metal selected from the group consisting of ammonium, alkali metals and alkaline earth metals.

13. The process of making a cellular polyurethane which comprises reacting a substance having active hydrogen atoms as determined by the Zerewitinoff method, an organic polyisocyanate, water, gel catalyst selected from the group consisting of $Sn(OCOR)_2$ and $R'_aSnX_b$ wherein R and R' are independently selected from the group consisting of alkyl, alkenyl, aryl, aralkyl, alkaryl and cycloalkyl, X is selected from the group consisting of chloride and negative residual portions of carboxylic acids, mercaptides, alcohols and esters of mercaptoacids, $a=1–3$ and $a+b=4$, and as a blowing catalyst a soap of a metal selected from the group consisting of ammonium alkali metals and alkaline earth metals; wherein the gel catalyst and the blowing catalyst are present in the ratio of 0.01 to 5 parts of the former per part of the latter.

14. The process of making a cellular polyurethane which comprises reacting 100 parts of a substance having active hydrogen atoms as determined by the Zerewitinoff method, 5–300 parts of an organic polyisocyanate, 0.5–10 parts of water, 0.005 to 4.2 parts of gel catalyst selected from the group consisting of $Sn(OCOR)_2$ and $R'_aSnX_b$ wherein R and R' are independently selected from the group consisting of alkyl, alkenyl, aryl, aralkyl, alkaryl and cycloalkyl, X is selected from the group consisting of chloride and negative residual portions of carboxylic acids, mercaptides, alcohols and esters of mercaptoacids, $a=1–3$ and $a+b=4$, and as a blowing catalyst 0.005 to 4.95 parts of a soap of a metal selected from the group consisting of ammonium alkali metals and alkaline earth metals.

15. The process of making a cellular polyurethane which comprises reacting a substance having active hydrogen atoms as determined by the Zerewitinoff method; an organic polyisocyanate, water, gel catalyst selected from the group consisting of $Sn(OCOR)_2$ and $R'_aSnX_b$ wherein R and R' are independently selected from the group consisting of alkyl, alkenyl, aryl, aralkyl, alkaryl and cycloalkyl, X is selected from the group consisting of chloride and negative residual portions of carboxylic acids, mercaptides, alcohols and esters of mercaptoacids, $a=1–3$ and $a+b=4$; and as a blowing catalyst a soap of a metal selected from the group consisting of ammonium alkali metals and alkaline earth metals, the anionic component of said soap having the formula $R'''(COO—)_n$, wherein $n$ is 1–3 and $R'''$ is a hydrocarbon group selected from the group consisting of alkyl, alkenyl, cycloalkyl, aryl, alkaryl and aralkyl hydrocarbon groups.

References Cited

UNITED STATES PATENTS

| | | | |
|---|---|---|---|
| 2,811,493 | 10/1957 | Simon et al. | 260—2.5 |
| 2,894,919 | 7/1959 | Simon et al. | 260—2.5 |
| 2,909,493 | 10/1959 | Bush | 260—23 |
| 3,058,943 | 10/1962 | Gray et al. | 260—45.75 |

FOREIGN PATENTS

| | | |
|---|---|---|
| 1,212,252 | 10/1959 | France. |
| 759,775 | 10/1956 | Great Britain. |

OTHER REFERENCES

Saunders: "Rubber Chem. & Tech.," vol 33, No. 5, December 1960; pages 1299–1302.

Hackh's Chemical Dictionary, 3rd ed., pages 777 and 778, pub. by McGraw-Hill Book Co., New York.

DONALD E. CZAJA, *Primary Examiner.*

LEON J. BERCOVITZ, *Examiner.*

C. WIVY, *Assistant Examiner.*